United States Patent [19]

Giles, Jr.

[11] Patent Number: 4,587,299

[45] Date of Patent: * May 6, 1986

[54] POLYETHERIMIDE BLENDS

[75] Inventor: Harold F. Giles, Jr., Cheshire, Mass.

[73] Assignee: General Electric Company, Pittsfield, Mass.

[ * ] Notice: The portion of the term of this patent subsequent to Jul. 12, 2000 has been disclaimed.

[21] Appl. No.: 566,659

[22] Filed: Dec. 29, 1983

[51] Int. Cl.$^4$ .................. C08L 79/08; C08L 53/00
[52] U.S. Cl. .................... 525/92; 525/180; 525/183
[58] Field of Search ............ 525/92, 183, 180

[56] References Cited

U.S. PATENT DOCUMENTS

| | | | |
|---|---|---|---|
| 3,231,635 | 1/1966 | Holden et al. | 260/880 |
| 3,251,905 | 5/1966 | Zelinski | 260/879 |
| 3,431,323 | 3/1969 | Jones | 260/880 |
| 3,670,054 | 6/1972 | De La Mare et al. | 260/880 B |
| 4,011,285 | 3/1977 | Seymour et al. | 525/92 |
| 4,119,607 | 10/1978 | Gergen et al. | 525/92 |
| 4,141,927 | 2/1979 | White et al. | 260/857 PA |
| 4,166,055 | 8/1979 | Lee, Jr. | 260/30.6 R |
| 4,220,735 | 9/1980 | Dieck et al. | 525/92 |
| 4,242,470 | 12/1980 | Gergen et al. | 525/92 |
| 4,252,913 | 2/1981 | Katchman et al. | 525/92 |
| 4,259,458 | 3/1981 | Robeson | 525/68 |
| 4,377,647 | 3/1983 | Durbin et al. | 525/92 |
| 4,393,168 | 7/1983 | Giles, Jr. et al. | 525/66 |
| 4,424,303 | 1/1984 | Liu | 525/92 |

FOREIGN PATENT DOCUMENTS 257010 4/1970 U.S.S.R. .

OTHER PUBLICATIONS

Koton, M. M. and Florinski, F. S., *Zh. Org. Khin.*, 4(5):774 (1968).
Kennedy, et al., *Polymer Chemistry of Synthetic Elastomers*, vol. 23, Part II, pp. 553-559 (1969).

*Primary Examiner*—John C. Bleutge
*Assistant Examiner*—A. L. Carrillo
*Attorney, Agent, or Firm*—Bernard, Rothwell & Brown

[57] ABSTRACT

This invention is concerned with polyetherimide blends. More particularly the polyetherimide blend comprises a polyetherimide and a block copolymer of a vinyl aromatic hydrocarbon and a diene hydrocarbon, and a polyester to form a ternary blend.

7 Claims, 6 Drawing Figures

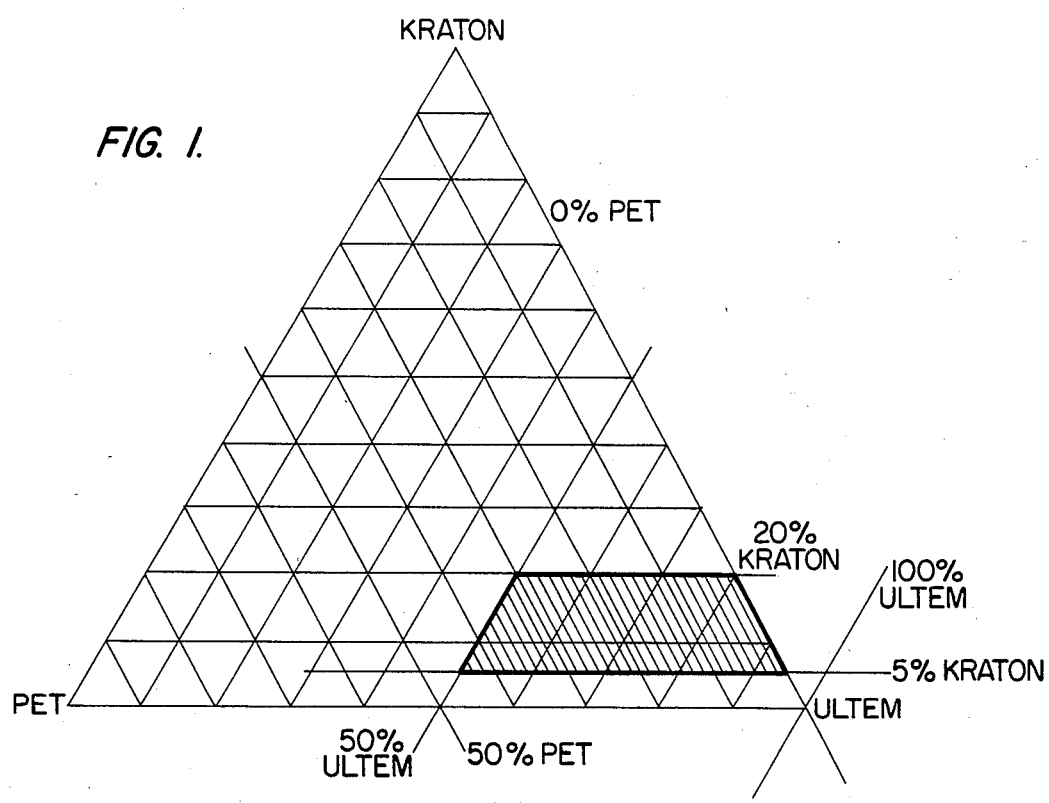
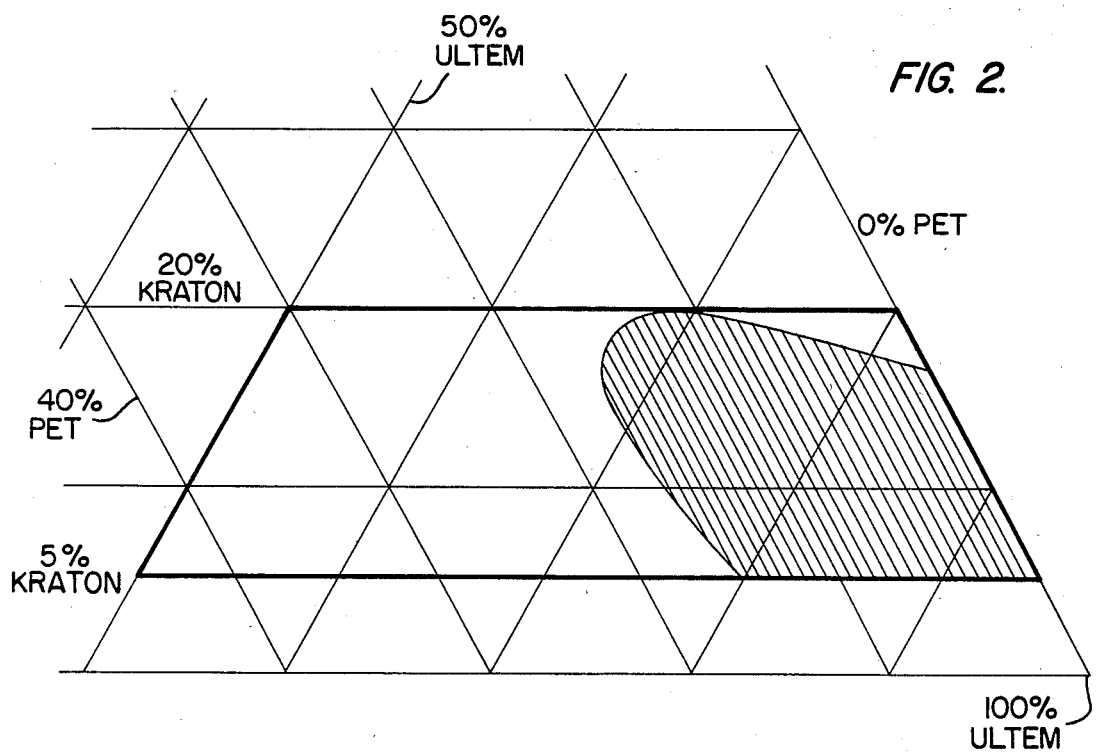

POLYETHERIMIDE BLENDS

BACKGROUND

The present invention relates to a class of polyetherimide blends comprising a polyetherimide, a block copolymer of a vinyl aromatic hydrocarbon and a alkene hydrocarbon and optionally a polyester.

Certain blends of polyetherimides and other polymers are known. For example, U.S. Pat. No. 4,141,927 discloses a polyetherimide-polyester binary mixture. U.S. Pat. No. 4,259,458 discloses a blend containing a polyarylate, a polyester, and at least one thermoplastic polymer selected from the group consisting of an aromatic polycarbonate, a styrene resin, an alkyl acrylate resin, a polyurethane, a vinyl chloride polymer, a poly(aryl ether), a copolyetherester block polymer or a polyhydroxyether.

SUMMARY OF THE INVENTION

In accordance with the present invention, a polyetherimide blend contains from 50 to 95 parts by weight of a polyetherimide, 0 to 45 parts by weight of a polyester and 5 to 20 parts by weight of a block copolymer of a vinyl aromatic compound and a alkene compound.

DETAILED DESCRIPTION

This invention relates to a class of polyetherimide blends comprised of the following elements: (1) a polyetherimide, (2) a block copolymer of a vinyl aromatic hydrocarbon and a alkene hydrocarbon and (3) optionally a polyester. These blends exhibit improved impact strengths, as compared to those of the individual components. Additionally, these blends show surprisingly good flexural properties in conjunction with significantly improved flow characteristics as the levels of either the polyester element, or the block copolymer of a vinyl aromatic hydrocarbon and a alkene hydrocarbon element are increased.

The blends of the invention include a polyetherimide of the formula:

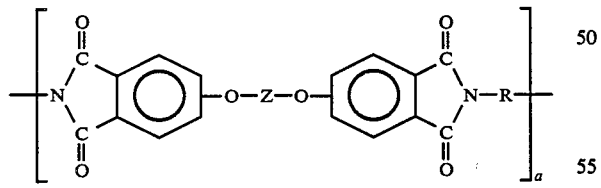

where "a" represents a whole number in excess of 1, e.g. 10 to 10,000 or more, Z is a member selected from the class consisting of (1):

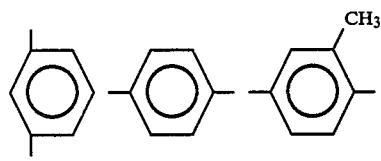

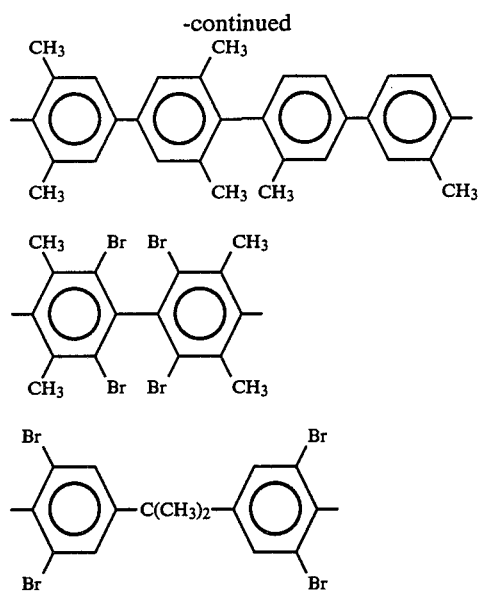

and (2) divalent organic radicals of the general formula:

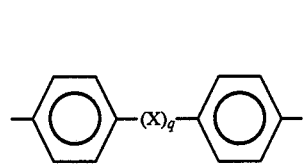

where X is a member selected from the class consisting of divalent radicals of the formulas,

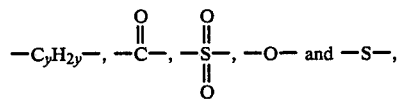

where q is 0 or 1, y is a whole number from 1 to 5, and divalent bonds of the —O—Z—O-radical are situated on the phthalic anhydride end groups, e.g., in the 3,3', 3,4', 4,3' or the 4,4' positions, and R is a divalent organic radical selected from the class consisting of (1) aromatic hydrocarbon radicals having from 6 to about 20 carbon atoms and halogenated derivatives thereof, (2) alkylene radicals and cycloalkylene radicals having from about 2 to about 20 carbon atoms, $C_{(2-8)}$ alkylene terminated polydiorganosiloxane, and (3) divalent radicals of the formula:

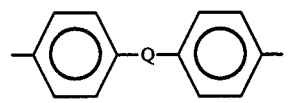

where Q is a member selected from the class consisting of:

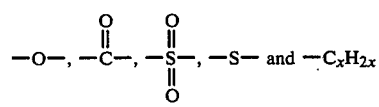

where x is a whole number from 1 to 5 inclusive.

The polyetherimides can be obtained by any of the methods well known to those skilled in the art including the reaction of any aromatic bis(ether anhydride) of the formula:

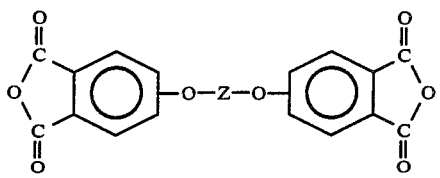

where Z is as defined above with an organic diamine of the formula

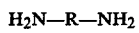

where R is as defined above.

Aromatic bis(ether anhydride)s of the above formula include, for example 2,2-bis[4-(2,3-dicarboxyphenoxy)phenyl]-propane dianhydride; 4,4'-bis(2-dicarboxyphenoxy)diphenyl ether dianhydride; 1,3-bis(2,3 dicarboxyphenoxy)benzene dianhydride; 4,4'-bis(2,3-dicarboxyphenoxy)diphenyl sulfide dianhydride; 1,4-bis(2-dicarboxyphenoxy)benzene dianhydride; 4,4'-bis(2,3-dicarboxyphenoxy) benzophenone dianhydride; 4,4'-bis(2,3-dicarboxyphenoxy)diphenyl sulfone dianhydride; 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 1,3-bis(3,4-dicarboxyphenoxy)benzene dianhydride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)-4'(3,4-dicarboxyphenoxy)diphenyl-2,2-propane dianhydride; etc. and mixtures of such dianhydrides.

In addition, aromatic bis(ether anhydride)s included by the above formula are shown by Koton, M.M.; Florinski, F. S.; Bessonov, M. I.; Rudakov, A. P. (Institute of Heteroorganic compounds, Academy of Sciences, U.S.S.R.), U.S.S.R. No. 257,010, Nov. 11, 1969, Appl. May 3, 1967. Such dianhydrides are also shown by M. M. Koton, F. S. Florinski, Zh. Org. Khin; 4(5), 774 (1968).

Organic diamines of the above formula include, for example, m-phenylenediamine, p-phenylenediamine, 4,4'-diaminodiphenylpropane, 4,4'-diaminodiphenylmethane, benzidine, 4,4'-diaminodiphenyl sulfide, 4,4'-diaminodiphenyl sulfone, 4,4'-diaminodiphenyl ether, 1,5 diaminonaphthalene, 3,3'-dimethylbenzidine, 3,3'-dimethoxybenzidine, 2,4-bis(β-amino-t-butyl)toluene, bis(p-β-amino-t-butylphenyl)ether, bis(p-β-methyl-o-aminopentyl)benzene, 1,3-diamino-4-isopropylbenzene, 1,2 bis(3-aminopropoxy)ethane, m-xylylenediamine, p-xylylenediamine, 2,4-diaminotoluene, 2,6-diaminotoluene bis(4-aminocyclohexyl)methane, 3-methylheptamethylenediamine, 4,4-dimethylheptamethylenediamine, 2,11-dodecanediamine, 2,2 dimethylpropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-aminopropyl)sulfide, N-methyl-bis (3-aminopropyl)amine, hexamethylenediamine, heptamethylenediamine, nonamethylenediamine, decamethylenediamine, bis(3-aminopropyl) tetramethyldisiloxane, bis(4-aminobutyl) tetramethyldisiloxane, and the like.

In general, the reactions can be advantageously carried out employing well-known solvents, e.g., o-dichlorobenzene, m-cresol/toluene, etc. in which to effect interaction between the dianhydrides and the diamines, at temperatures of from about 100° C. to about 250° C. Alternatively, the polyetherimides can be prepared by melt polymerization of any of the above dianhydrides with any of the above diamine compounds while heating the mixture of the ingredients at elevated temperatures with concurrent intermixing. Generally, melt polymerization temperatures between about 200° C. to 400° C. and preferably 230° C. to 300° C. can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mole percent) of diamine can be employed resulting in the production of polyetherimides having terminal amine groups. Generally, useful polyetherimides have an intrinsic viscosity [$\eta$] greater than 0.2 deciliters per gram, preferably 0.35 to 0.60, or 0.7 deciliters per gram or even higher when measured in m-cresol at 25° C.

The second component of the blends of this invention is a block copolymer of a vinyl aromatic hydrocarbon and a alkene hydrocarbon. These block copolymers are well known and are described, for instance, in Polymer Chemistry of Synthetic Elastomers, edited by Kennedy et al., Interscience Publishers, Vol. 23, Part II (1969), pages 553–559. Such block copolymers are also described, for example, by Zelinski, U.S. Pat. No. 3,251,905, and Holden et al., U.S. Pat. No. 3,231,635 which are incorporated herein by reference.

In general, the block copolymer is represented by the formula, —A—B—A—, in which terminal blocks, A, which can be the same or different, are thermoplastic homopolymers or copolymers prepared from a vinyl aromatic compound wherein the aromatic moiety can be either monocyclic or polycyclic. Examples of such vinyl aromatic compounds include styrene, alpha-methyl styrene, vinyl toluene, vinyl xylene, ethyl vinyl xylene, vinyl napththalene and the like, or mixtures thereof.

The center block, B, is an elastomeric polymer derived from a alkene hydrocarbon, such as ethylene and butylene and conjugated dienes, e.g., 1,3-butadiene, 2,3-dimethylbutadiene, isoprene, 1,3-pentadiene, and the like, or mixtures thereof.

The ratio of the copolymers and the average molecular weights of each can vary broadly. Frequently, however, the molecular weight of center block, B, will be greater than that of the continued terminal blocks, which appear to be necessary for optimum impact strength and solvent resistance. The molecular weight of terminal block, A, will preferably range from about 2,000 to about 100,000, while the molecular weight of center block, B, is preferably from about 25,000 to about 1,000,000.

If desired, the block copolymers can be post-treated to hydrogenate the rubber portion of the copolymer. Hydrogenation can be accomplished using conventional hydrogenation catalysts and reaction conditions.

With respect to the hydrogenated A—B—A block copolymers, it is preferred to form terminal block A having average molecular weight of from about 4,000 to about 115,000 and center block B having an average molecular weight of from about 20,000 to about 450,000. Still more preferably, the terminal block A will have an average molecular weight of from 8,000 to 60,000 while center block B still have an average molecular weight of from 50,000 to 300,000.

The terminal block can comprise from 2 to 48% by weight, preferably from 5 to 35% by weight of the block copolymer.

Particularly preferred hydrogenated block copolymers are those having a polybutadiene center block wherein from 35 to 55%, more preferably from 40 to 50% of the butanediene carbon atoms are vinyl side chains.

Hydrogenated block copolymers are described further by Jones, U.S. Pat. No. 3,431,323 and DeLaMare et al., U.S. Pat. No. 3,670,054, both of which are incorported herein by reference.

In preferred blends, the second component will be an A—B—A block copolymer of the polystyrene-polybutadiene-polystyrene or polystyrene-polyisoprene-polystyrene type wherein the polybutadiene or polyisoprene portion can be either hydrogenated or non-hydrogenated. Particularly preferred are the A—B—A block copolymers of the styrene-ethylene-butylene-styrene (SEBS) type.

The above block copolymers of a vinyl aromatic hydrocarbon and a alkene hydrocarbon are well known in the art. They are commercially available from Shell Chemical Company of Houston, Tex., under the trademark KRATON®. Particularly preferred are the KRATON®G grades that are of the SEBS type. The KRATON®G grades are available with varying styrene/rubber ratios, for example KRATON®G-1657 has a 14/86 styrene/rubber ratio while KRATON®G-1651 has a 33/67 styrene to rubber ratio.

The polyesters that can be employed in the blends of this invention are conventional or known polyesters made according to conventional or known methods. The polyesters include polymers formed from dicarboxylic acids containing a total of from about 2 to about 16 carbon atoms reacted with polyhydric alcohols such as glycols or diols containing from 2 to 12 carbon atoms. Aliphatic dicarboxylic acids may contain a total of from 2 to 16 carbon atoms. Preferably, the acids are aryl or an alkyl substituted aromatic acids containing from 8 to 16 carbon atoms. Specific examples of linear aliphatic dicarboxylic acids include oxalic acid, malonic acid, succinic acid, glutaric acid, adipic acid, pimelic acid, suberic acid, azelaic acid, sebacic acid, and the like. Specific examples of an aryl acid include the various isomers of phthalic acid, such as paraphthalic acid (terephthalic acid) and naphthalic acid. Specific examples of alkyl substituted aryl acids include the various isomers of dimethylphthalic acid such as dimethylisophthalic acid, dimethylorthophthalic acid, dimethylterephthalic acid, the various isomers of diethylphthalic acid such as diethylisophthalic acid, diethylorthophthalic acid, diethylterephthalic acid, the various isomers of dimethylnaphthalic acid such as 2,6-dimethylnaphthalic acid and 2,5-dimethylnaphthalic acid, and the various isomers of dimethylnaphthalic acid such as 2,6-dimethylnaphthalic acid and 2,5-dimethylnaphthalic acid, and the various isomers of diethylnaphthalic acid. Particularly preferred is terephthalic acid. When two or more dicarboxylic acids are used, it is particularly preferred that at least 90 mole percent of the total acid moiety be terephthalic acid. Generally an excess of 95 mole percent terephthalic is the most preferred.

It is well known to those skilled in the art that in lieu of the various dicarboxylic acids, the various diesters thereof may be utilized. Thus, alkyl diesters containing a total of from 2 to about 20 carbon atoms as well as alkyl substituted aryl diesters containing from about 10 to about 20 carbon atoms may be utilized. Examples of diesters include the diesters of oxalic acid, malonic acid, succinic acid, glutaric acid, adipic acid, pimelic acid, suberic acid, azelaic acid, or sebacic acid, and the like. Specific examples of various alkyl substituted aryl diesters include the various isomers of dimethylphthalate such as dimethylterephthalate, a preferred compound, the various isomers of diethylphthalate, the various isomers of dimethylnaphthalate, and the various isomers of diethylnaphthalate.

The diols or glycols may be straight chain or branched. The diols may also be aliphatic or cycloaliphatic. Specific examples include ethylene glycol, propylene glycol, trimethylene glycol, 1,2-butanediol, 1,3-butanediol, 1,4-butanediol, 2,3-butanediol, neopentyl glycol, cyclohexanedimethanol, and the like. Of the various glycols, those having from 2 to 8 carbon atoms are preferred with ethylene glycol being particularly preferred. In lieu of the various glycols, another class of polyhydric alcohols, such as the glycol ethers containing from 4 to 12 carbon atoms, can be utilized as for example dimethylene glycol and 1,4-dihydroxyethoxy benzene.

The polyesters employed in the blends of this invention can generally be made according to conventional melt polymerization, or melt and solid state polymerization techniques.

The polyetherimide blends of the present invention can contain a broad range of relative proportions of the polymer compounds. These blends generally include compositions comprising:

| | | |
|---|---|---|
| 1. | polyetherimide | 50–95% |
| 2. | polyester | 0–45% |
| 3. | block copolymer of a vinyl aromatic hydrocarbon and a alkene hydrocarbon | 5–20% | the percentages being by percent by weight of the total polymer weight.

By varying the relative proportions of the polyetherimide blend, one can produce a broad spectrum of resins each having their respective properties. For example, impact strengths (notched Izod values) can range as low as 39 to greater than 180 joules per meter. A large number of resins can be produced with varying flexural properties. Resins have been produced having an initial modulus ranging from 1.50 gegapascals to about 3.0 gegapascals.

Particularly preferred blends of this invention contain polyetherimide to polyester to block copolymer in weight ratios of from about 75:20:5 to about 80:15:5.

Methods for forming the polyetherimide blends of the present invention may vary considerably. Prior art blending techniques are generally satisfactory. A preferred method comprises blending the polymers, extruding the blend, and chopping the extrudate into pellets suitable for molding by means conventionally used to mold normally solid thermoplastic compositions.

The polyetherimide blends of the present invention enable one to more specifically tailor a resin to its end use. These blends permit the manufacturer to make a less expensive product as well as make new products that were not previously envisioned.

The invention is further illustrated by the following example, which is not intended to be limiting.

EXAMPLE

Blends were extruded in a 28 mm Werner Pfleiderer twin screw extruder. The temperature ranges were from 330° C. at the feed throat to 325° C. at the die. After equilibrium had been achieved, the extrudate was chopped into pellets. The pellets were injection molded at a temperature of 315° C. and a mold temperature of 95° C. The molded specimens were then evaluated to determine standard mechanical properties.

The tables below list the proportions of each component of the polyetherimide blend as well as the resulting properties. The Izod impact data was determined from tests based on ASTM Method D-256. The heat deflection temperture (HDT) was determined from tests based on ASTM Method D-648. The flexural data was determined from tests based on ASTM Method D-790. The tensile data was based on ASTM Method D-638. Garder Impact data was based on ASTM Method D-3029.

The polyester that was used was CLEARTUFF® 0 7202. This polyester is a polyethylene terephthalate resin having an intrinsic viscosity of 0.72 and is currently available from The Goodyear Tire and Rubber Company of Akron, Ohio.

The block copolymer was KRATON®G 1651 which is a styrene-ethylene-butylene-styrene (SEBS) block copolymer and is commercially available from Shell Chemical Company of Houston, Tex.

TABLE 3

Tensile Properties (Type 1 Tensile Bars)

| Extrudate Sample | Modulus Gegapascals | Yield Percent | Yield Megapascals | Failure Percent | Failure Megapascals |
|---|---|---|---|---|---|
| 1 | 2.15 | * | — | 2.7 | 38.4 |
| 2 | 1.99 | * | — | 4.1 | 32.8 |
| 3 | 2.49 | 4.3 | 74.5 | 4.3 | 71.0 |
| 4 | 2.25 | * | — | 2.9 | 55.2 |
| 5 | 2.73 | 5.1 | 79.3 | 9.9 | 55.2 |
| 6 | 2.22 | 5.0 | 64.4 | 5.9 | 61.4 |
| 7 | 2.41 | * | — | 3.7 | 61.2 |
| 8 | 2.02 | * | — | 3.0 | 45.1 |
| 9 | 2.79 | * | — | 3.9 | 75.2 |
| 10 | 1.67 | 2.5 | 28.1 | 2.9 | 26.4 |
| 11 | 2.53 | 3.5 | 64.3 | 3.7 | 59.6 |

*Broke at yield point

Referring to the above test results, when SEBS is blended with polyetherimides in a weight ratio of 5 to 95 of SEBS to polyetherimide, typical notched Izod values of 224 joules per meter, an initial modulus of 1.96 gegapascals and a tensile modulus of 2.53 gegapascals are obtained. When the SEBS level was 5 weight percent, polyetherimide was 72.5 weight percent and PET was at 22.5 weight percent, the notched Izod value was 57 joules per meter, the flexural modulus was 2.995 gegapascals and the tensile modulus was 2.79 gegapascals. The partial substitution of PET for the polyetherimide yields a resin which not only exhibits excellent notched Izod values but maintains desirable tensile strengths and flexural modulus.

The polyetherimide blends of the present invention are graphically illustrated in FIG. 1.

FIGS. 2-6 are enlargements of the area of the graph of FIG. 1 which depicts the present invention.

TABLE 1

| Extrudate Sample | Composition % Polyetherimide | % PET | % SEBS | Izod-Impact joules/meter (0.32 cm bar) Notched | Izod-Impact joules/meter (0.32 cm bar) Unnotched | Gardner-Impact joules (0.32 cm plaque) |
|---|---|---|---|---|---|---|
| 1 | 81.9 | 9.4 | 8.7 | 181 | 237 | .42 |
| 2 | 74.4 | 9.4 | 16.2 | 120 | 330 | .46 |
| 3 | 59.4 | 31.8 | 8.8 | 58 | 600 | .61 |
| 4 | 59.4 | 24.4 | 16.2 | 46 | 510 | .95 |
| 5 | 50 | 45 | 5 | 39 | 763 | 2.2 |
| 6 | 50 | 30 | 20 | 66 | 736 | 1.4 |
| 7 | 68.8 | 18.8 | 12.4 | 55 | 448 | .60 |
| 8 | 65 | 15 | 20 | 120 | 490 | .89 |
| 9 | 72.5 | 22.5 | 5 | 57 | 412 | .58 |
| 10 | 80 | 0 | 20 | 87 | 220 | .69 |
| 11 | 95 | 0 | 5 | 224 | 406 | .40 |

TABLE 2

| Extrudate Sample | HDT @ 264 psi °C. | Flexural Properties (0.32 cm. bar) Initial Mod. gegapascals | Strength @ 5% Strain megapascals | Ultimate Stress megapascals | Strain @ Ultimate Stress % |
|---|---|---|---|---|---|
| 1 | 173 | 1.89 | 67.6 | 68.2 | 5.8 |
| 2 | 170 | 1.50 | 30.2 | 45.7 | 4.0 |
| 3 | 136 | 2.83 | 115 | 121 | 6.3 |
| 4 | 140 | 2.17 | 69.6 | 71.8 | 4.8 |
| 5 | 118 | 2.86 | 121 | 127 | 6.3 |
| 6 | 125 | 2.28 | 85.5 | 86.6 | 5.5 |
| 7 | 150 | 2.44 | 81.9 | 82.3 | 4.7 |
| 8 | 151 | 1.69 | 30.7 | 52.8 | 3.7 |
| 9 | 142 | 2.995 | 118 | 124 | 6.5 |
| 10 | 185 | .598 | 3.24 | 13.6 | 3.5 |
| 11 | 199 | 1.96 | 69.7 | 73.1 | 6.7 |

FIG. 2 illustrates the relationship between the relative proportions of components and notched Izod test results. The shaded area depicts blends having relatively high notched Izod values.

Figure 3:
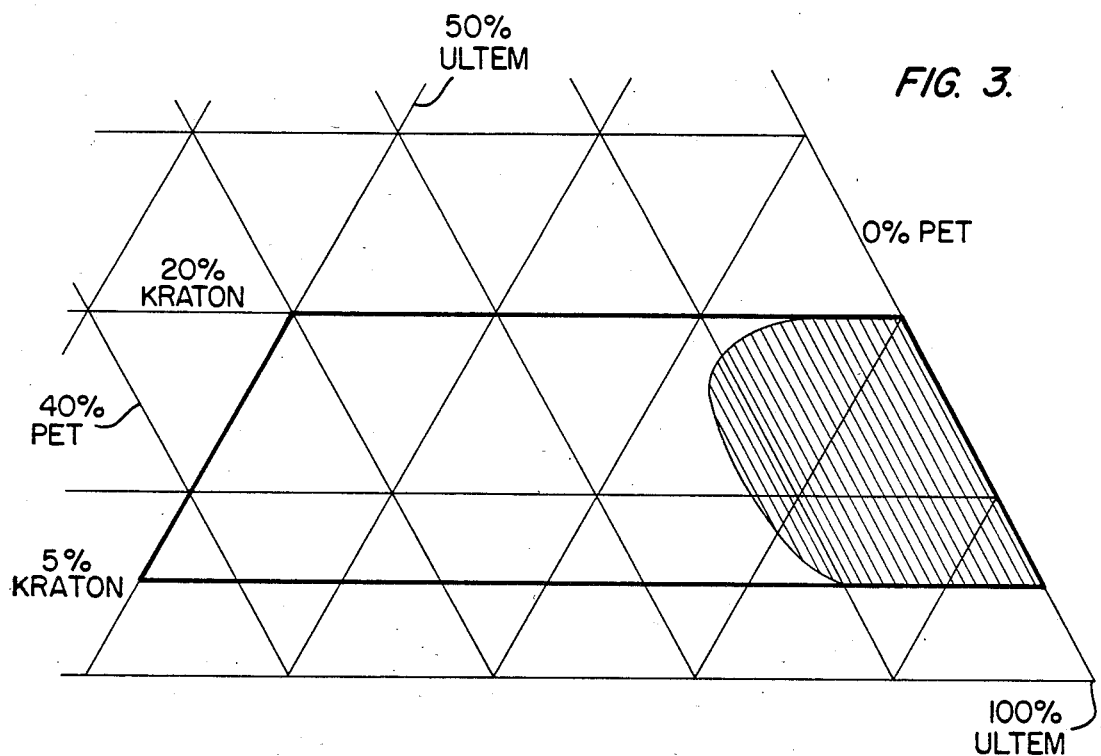
FIG. 3 depicts the area of proportions associated with high heat distortion temperatures (HDT).
Figure 4:
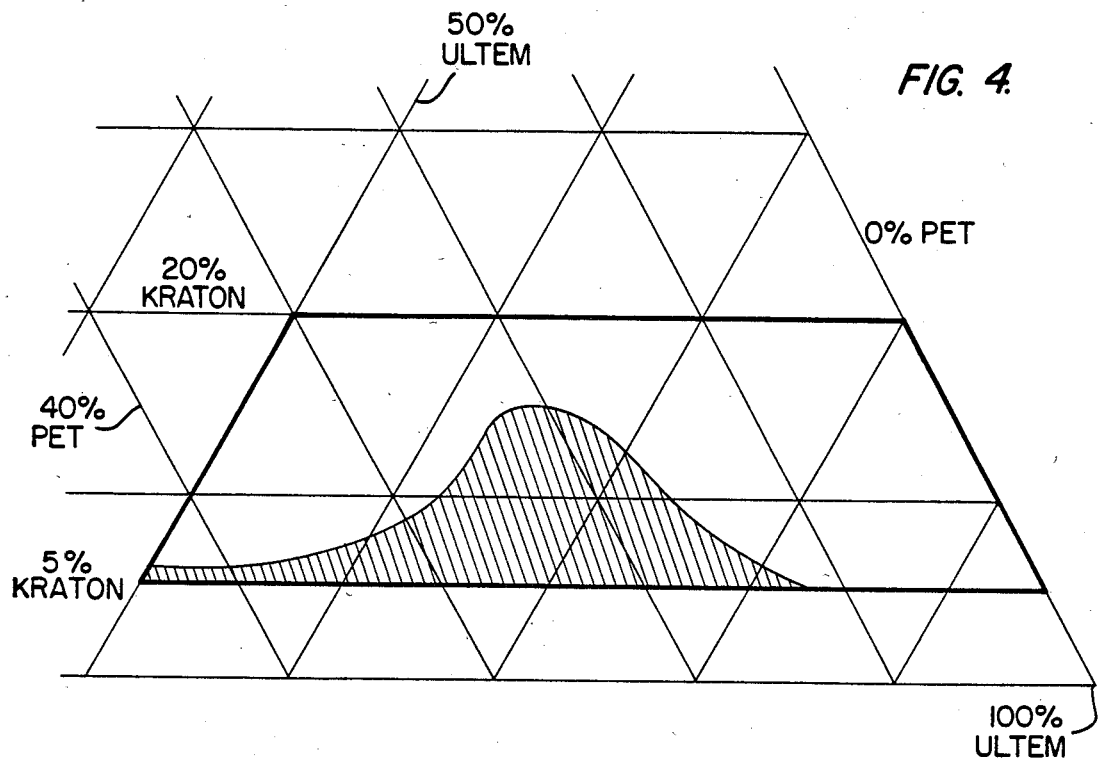
FIG. 4 depicts the area of proportions associated with relatively high flexural modulus.
Figure 5:
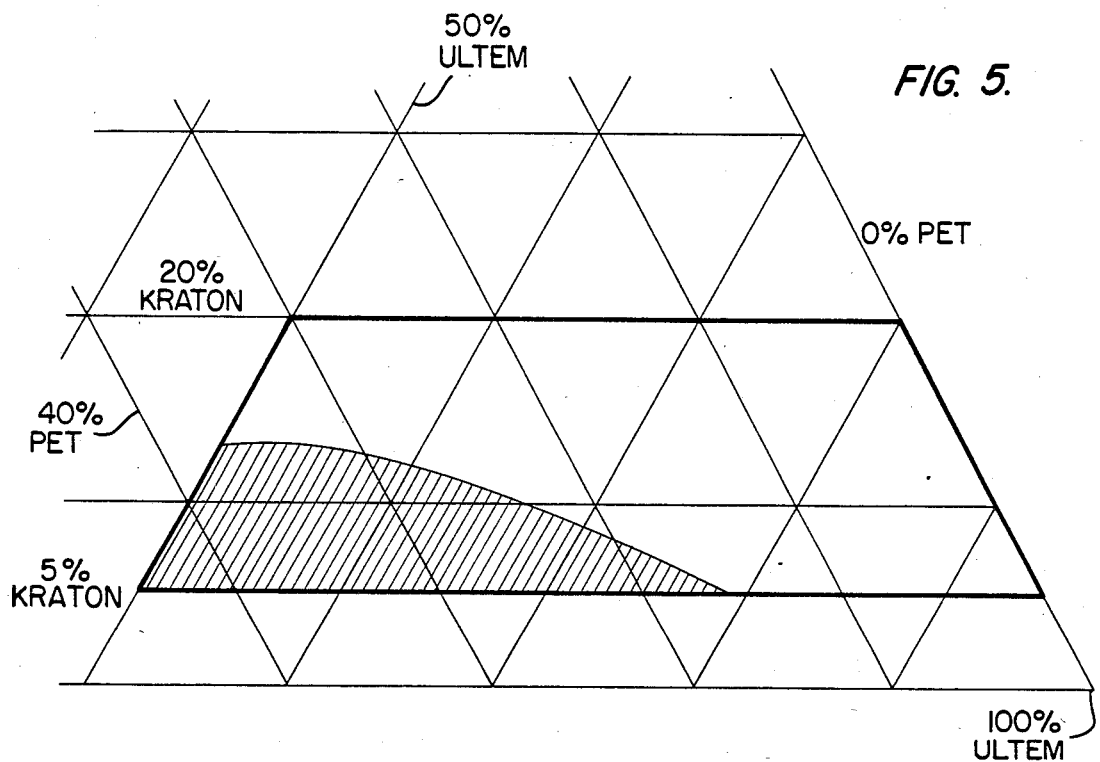
FIG. 5 depicts the area of proportions associated with relatively high flexural strengths.
Figure 6:
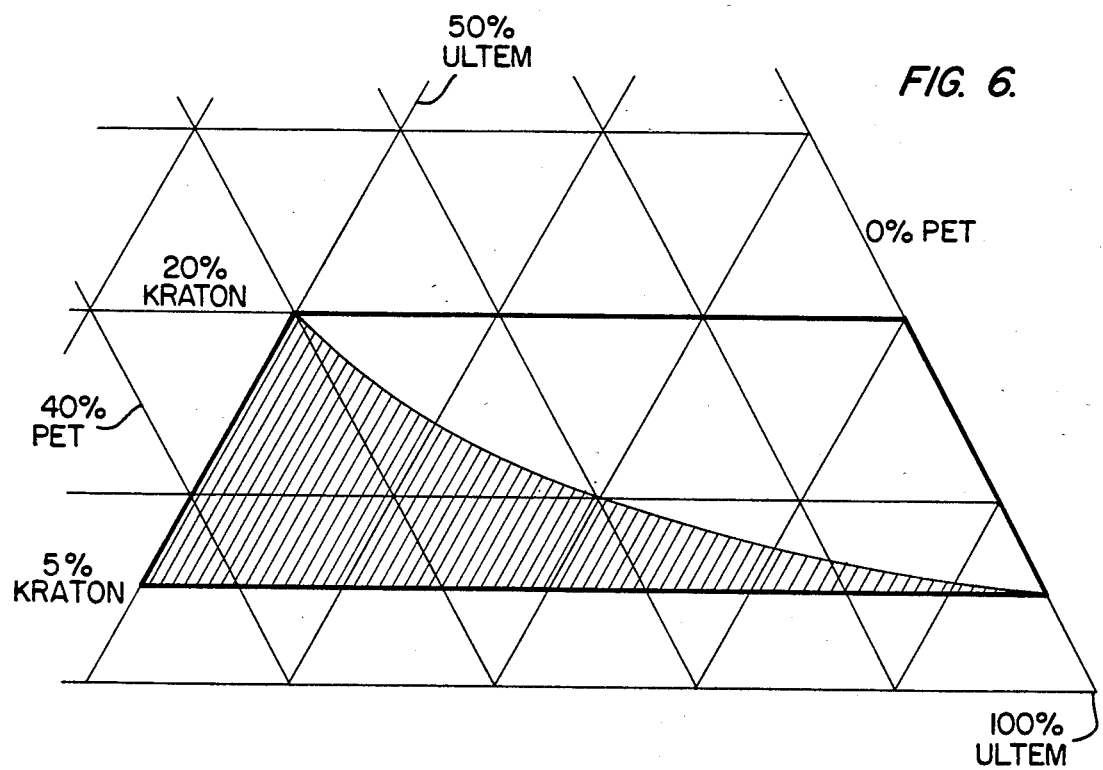
FIG. 6 depicts the area of proportions associated with relatively high tensile strengths.

Modifications and variations of the present invention will be apparent to those skilled in the art in light of the above teachings. It is, therefore, to be understood that changes may be made in the particular embodiments of the invention described which are within the full intended scope of the appended claims.

I claim:

1. A polyetherimide blend comprising from (a) about 50 to about 5 parts by weight of a polyetherimide; (b) 9.4 to 45 parts by weight of a polyester resin; and (c) about 5 to about 20 parts by weight of a block copolymer of a vinyl aromatic compound (A) and an alkene compound (b), of the A—B—A type, the center block being of higher molecular weight than that of the combined terminal blocks.

2. Tho polyetherimide blend of claim 1, wherein said polyetherimide is of the formula:

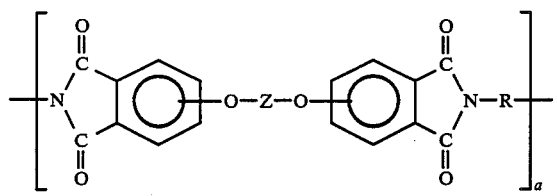

where "a" represents a whole number in excess of 1, e.g. 10 to 10,000 or more, Z is a member selected from the class consisting of (1):

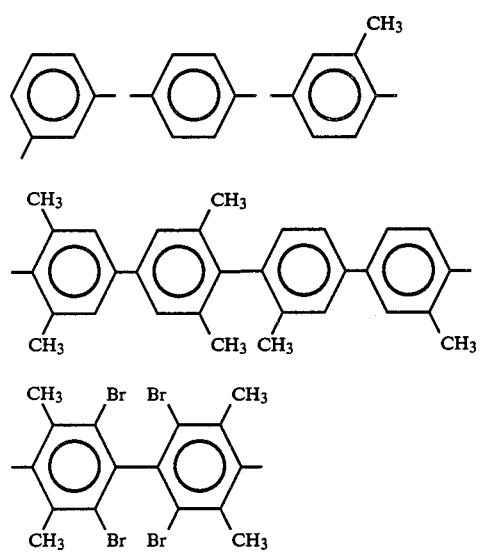

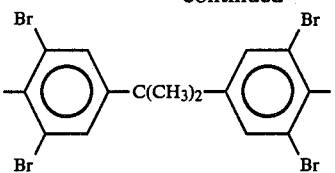

and (2) divalent organic radicals of the general formula:

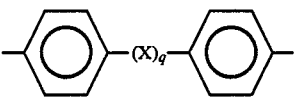

where X is a member selected from the class consisting of divalent radicals of the formulas,

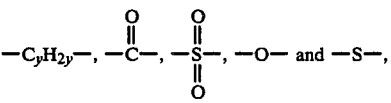

where is 0 or 1, y is a whole number from 1 to 5, and divalent bonds of the —O—Z—O— radical are situated on the phthalic anhydride end groups, e.g., in the 3,3', 3,4', 4,3' or the 4,4' positions and R is a divalent organic radical selected from the class consisting of (1) aromatic hydrocarbon radicals having from 6 to about 20 carbon atoms and halogenated derivatives thereof, (2) alkylene radicals and cycloalkylene radicals having from about 2 to about 20 carbon atoms, $C_{(2-8)}$ alkylene terminated polydiorganosiloxane, and (3) divalent radicals of the formula:

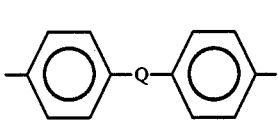

where Q is a member selected from the class consisting of

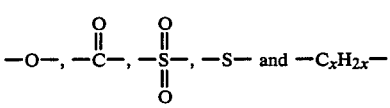

where x is a whole number from 1 to 5 inclusive.

3. The polyetherimide of claim 1 wherein said polyester is made from the reaction of dicarboxylic acid and diesters with a polyhydric alcohol, said dicarboxylic acid selected from the group consisting of alkyl dicarboxylic acids having a total of from 2 to 16 carbon atoms, aryl or alkyl substituted aryl dicarboxylic acids containing a total of from 8 to about 16 carbon atoms, and combinations thereof, said diester having from 4 to 20 carbon atoms, an alkyl substituted aryl ester having from 10 to 20 carbon atoms, and combinations thereof, and wherein said polyhydric alcohol is selected from the group consisting of glycols having from 2 to 11 carbon atoms, from glycol ethers containing from 4 to 12 carbon atoms, and combinations thereof.

4. The polyetherimide blend of claim 1 wherein said polyester is polyethylene terephthalate or polybutylene terephthalate.

5. The polyetherimide blend of claim 1 wherein the vinyl aromatic compound is styrene and the alkene compound is selected from the group consisting of ethylene, butylene, isoprene and butadiene or mixtures thereof.

6. The polyetherimide blend of claim 5 wherein said diene compound is butylene and ethylene.

7. The polyetherimide blend of claim 4, 5, or 6, wherein the weight ratio of polyetherimide to polyester to block copolymer ranges from about 75:20:5 to about 80:15:5.

* * * * *